March 18, 1941.   O. DOBKIN   2,235,493

VEHICLE WINDSHIELD WIPER

Filed Dec. 8, 1937

Inventor
OSCAR DOBKIN

By J. Ralph Barrow,
Attorney

Patented Mar. 18, 1941

2,235,493

UNITED STATES PATENT OFFICE 2,235,493

VEHICLE WINDSHIELD WIPER

Oscar Dobkin, Akron, Ohio

Application December 8, 1937, Serial No. 178,731

2 Claims. (Cl. 15—250)

This invention relates to vehicle windshield wipers.

One object of the invention is to provide a vehicle windshield wiper which will effectively clear an area of windshield of rain, sleet, snow or the like, and which when idle or in operation will not obscure the vehicle operator's vision.

Another object of the invention is to provide a windshield wiper of the character described which may have wiper elements revolving about a fixed point away from the windshield.

Another object of the invention is to provide a windshield wiper of the character described which is simple of construction and efficient in operation.

These and other objects will be manifest from the following brief description and the accompanying drawing.

Figure 1:
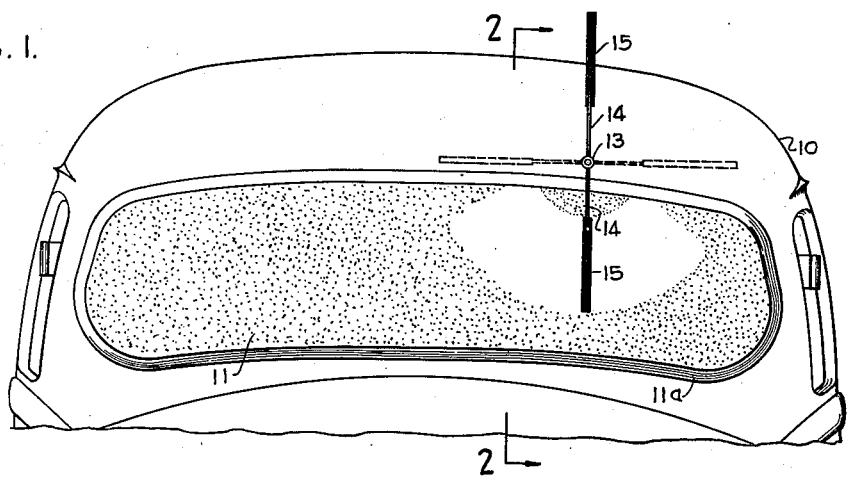
Figure 1 is a fragmentary front elevation at the front of an automobile having a windshield wiper embodying the invention thereon.
Figure 2:
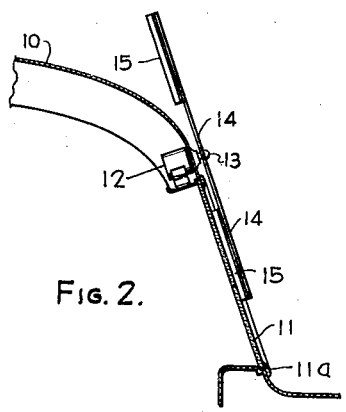
Figure 2 is a cross-section on the line 2—2 of Figure 1.

Referring to Figures 1 and 2 of the drawing, 10 indicates an automobile body having a front windshield 11 of glass or the like mounted therein, substantially as shown. Suitably mounted in the body 10, preferably in a concealed position therein just above the windshield 11, there is mounted a motor 12. The motor 12 may be electrically driven and is provided with a shaft 13 which projects outwardly of the body 10 and preferably has mounted on it a pair of slightly flexible arms 14, 14 to the ends of which there has been attached wiper blades 15, 15 adapted to engage the windshield 11 as the arms 14 are rotated by the motor 12. The wiper blades 15 may be made from a flexible or resilient material, such as rubber, so that they will pass freely over the edges of the frame 11ª surrounding the windshield 11 while the wiper is in operation.

When the wiper is in use the motor is operated to swing the arms 14 on shaft 13 at such a high velocity that the arms 14 with the blades 15 thereon become invisible to the vehicle operator. Thus the operator of the vehicle is enabled to see through the part of windshield 11 cleared by the swinging blades 15 without having his vision substantially obscured by any swinging parts of the wiper mechanism. Also, by rotating the blades 15 in a continuous arc at a high velocity, the windshield is kept clear of rain, sleet and snow before the latter has a chance to settle or freeze thereon.

Figure 3:
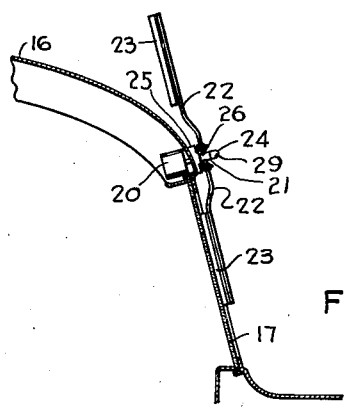
Figure 3 is a view similar to Figure 2, illustrating another embodiment of the invention.
Figure 4:
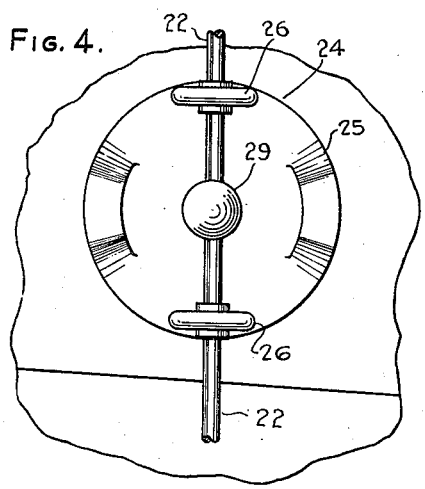
Figure 4 is an enlarged fragmentary view of a part of the wiper mechanism shown in Figure 3.
Figure 5:
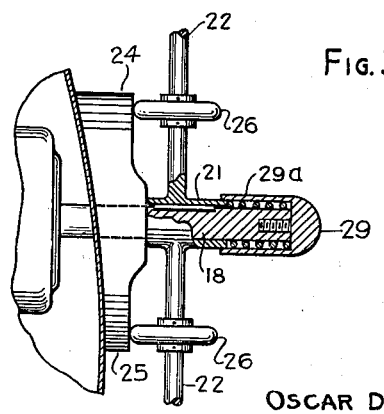
Figure 5 is a side elevation, partly broken away and in section, of the mechanism shown in Figure 4, as viewed from the left thereof.

Figures 3 to 5, inclusive, illustrate another embodiment of the invention adapted for use, for example, where there is a substantial drop between the portion of the body 16 adjacent the top edge of the windshield 17 and the surface of the windshield. Slidably keyed on a shaft 18 of a suitable motor 20, concealed with the body 16, there may be a hub member 21 having a pair of integral arms 22, 22 thereon for carrying flexible or resilient wiper blades 23, 23. For moving the wiper blades 23 inwardly and outwardly at the proper periods to maintain clearance of the projecting portion of body 16 as the blades 23 are swung at a high velocity in a continuous arc, and at the same time maintaining a smooth wiping action of blades 23 on the windshield 17, there may be provided suitable mechanism indicated generally at 24. The mechanism 24 may include a cam 25 adapted to have small rollers 26, 26 rotatably mounted on the arms 22, engaged therewith in such a manner that the wiper blades 23 are moved outwardly when one or other of them approaches the projecting portion of the body 16 on the upward swing, and moved inwardly on the downward swing. The rollers 26 are maintained in continuous yielding contact with the surface of cam 25, preferably by means of a coil spring 27 engaging between hub member 21 and stop member 29 secured on the end of shaft 18. The stop member 29 may have an inwardly extending sleeve portion 29ª thereon, adapted to cover the spring 27 and to have hub member 21 slide telescopically therein during its reciprocating motion.

In the operation of the modified form of wiper, motor 20 is driven to revolve the blades 23 at a high velocity, as described for the case of the first form of the invention, the essential difference residing in the use of the mechanism 24 for moving the blade 23 inwardly and outwardly to avoid protruding portions of the body 16 adjacent the edge of the windshield 17.

Thus has been provided a windshield wiper which will keep a sufficient area of a windshield free and clear of rain, sleet or snow. The high velocity at which the wiper blades and the arms upon which they are carried are driven makes them substantially invisible to the vehicle operator, and so minimize interference with his being able to see through the cleared area of windshield. At the same time the blades are caused to move across the cleared area of the windshield so fast that the rain, sleet or snow is not allowed to collect or to freeze thereon. The windshield wiper may be stopped in any suitable manner in a position, shown in dotted lines in Figure 1, so as not to interfere with the operator's vision when the wiper is not in use.

Modifications of the invention may be resorted to without departing from the spirit of the invention or the scope of the appended claims.

What is claimed is:

1. A windshield wiper for vehicles comprising a shaft, means for rotatably mounting said shaft on the vehicle body at a point away from the marginal edge of the vehicle windshield, means for rotating said shaft, a member axially slidably mounted on said shaft to rotate therewith, a pair of oppositely disposed arms fixed on said member, wiper elements carried by said arms, a cam having cam surfaces concentric with said shaft, riders on said arms adapted to ride on said cam surfaces, and means for yieldingly urging said member axially inwardly of said cam to maintain said riders in contact with said cam surface, said cam surface having portions for axially shifting said member to move said wiper elements to and away from the windshield to avoid overhanging portions of said vehicle body adjacent said marginal edge of the windshield as the wipers approach and leave the windshield.

2. A windshield wiper for vehicles comprising a shaft, means for rotatably mounting said shaft on the vehicle body at a point away from the marginal edge of the vehicle windshield, means for rotating said shaft, a member axially slidably mounted on said shaft to rotate therewith, a pair of oppositely disposed arms fixed on said member, wiper elements carried by said arms, a cam having cam surfaces concentric with said shaft, riders on said arms adapted to ride on said cam surfaces, and means for yieldingly urging said member axially inwardly of said cam to maintain said riders in contact with said cam surfaces, said cam surfaces having oppositely disposed projecting portions for axially shifting said member to move said wiper elements to and away from the windshield to avoid overhanging portions of said vehicle body adjacent said marginal edge of the windshield as the wipers approach and leave the windshield.

OSCAR DOBKIN.